United States Patent [19]
Faraboschi et al.

[11] Patent Number: 5,930,508
[45] Date of Patent: Jul. 27, 1999

[54] METHOD FOR STORING AND DECODING INSTRUCTIONS FOR A MICROPROCESSOR HAVING A PLURALITY OF FUNCTION UNITS

[75] Inventors: Paolo Faraboschi, Cambridge, Mass.; Prasad Raje, Fremint, Calif.

[73] Assignee: Hewlett-Packard Company, Palo Alto, Calif.

[21] Appl. No.: 08/871,128

[22] Filed: Jun. 9, 1997

Related U.S. Application Data

[63] Continuation-in-part of application No. 08/767,450, Dec. 16, 1996.

[51] Int. Cl.⁶ .................................. G06F 9/30; G06F 7/00
[52] U.S. Cl. ..................... 395/706; 395/386; 395/380; 395/382; 395/391; 395/800.23; 395/800.24; 395/709
[58] Field of Search ........................... 395/380, 382, 395/386, 389, 391, 800.23, 800.24, 709, 706

[56] References Cited

U.S. PATENT DOCUMENTS

| | | | |
|---|---|---|---|
| 5,057,837 | 10/1991 | Colwell et al. | 341/55 |
| 5,179,680 | 1/1993 | Colwell et al. | 395/425 |
| 5,404,469 | 4/1995 | Chung et al. | 395/391 |
| 5,438,668 | 8/1995 | Coon et al. | 395/380 |
| 5,471,593 | 11/1995 | Branigin | 395/395 |
| 5,502,826 | 3/1996 | Vassiliadas et al. | 395/800.24 |
| 5,574,939 | 11/1996 | Keckler et al. | 395/800.24 |
| 5,600,810 | 2/1997 | Ohkami | 395/567 |
| 5,630,157 | 5/1997 | Dwyer, III | 395/800.23 |
| 5,632,024 | 5/1997 | Yajima et al. | 395/381 |
| 5,652,852 | 7/1997 | Yokota | 395/384 |
| 5,732,234 | 3/1998 | Vassiliadas et al. | 395/706 |
| 5,758,114 | 5/1998 | Johnson et al. | 395/380 |
| 5,761,470 | 12/1995 | Yoshida | 395/384 |
| 5,787,302 | 5/1996 | Hampapuram et al. | 395/800.24 |
| 5,819,058 | 2/1997 | Miller et al. | 395/386 |

OTHER PUBLICATIONS

Conte et al., Instruction Fetch Mechanism for VLIW Architectures with Compressed Encodings, IEEE, Dec. 4, 1996.

Conte et al., Dynamic Rescheduling: A technique for Object Code Compatibility in VLIW Architectures, Proceeding of the 1995 28th Annual International Symposium on Microarchitecture, Nov. 29–Dec. 1(ann Arbor, MI).

Banerjia et al., NextPC computation for a banked instruction cache for a VLIW architecture with a compressed encoding, Technical Report, http//www.ece.ncsu.edu/tinker/nextpc tr.ps, Jun. 1996.

*Primary Examiner*—Parshotam S. Lall
*Assistant Examiner*—William D. Thomson

[57] ABSTRACT

A method and apparatus for compacting VLIW instructions in a processor having multiple functional units and including a buffer for storing compacted instructions, wherein NOP codes are eliminated from the compacted instruction and each compacted instruction includes words which contain an operation code directing the operation of one of the functional units, a dispersal code, and a delimiter code, wherein an alignment circuit parses each compacted instruction from the buffer based upon the delimiter codes of the words and aligns the compacted instruction in an alignment buffer and a dispersal circuit transfers each word of the compacted instruction stored in the alignment buffer into at least one operational field of a dispersed instruction buffer which stores an executable instruction having an operational field corresponding to each one of the functional units. Another embodiment is also shown which interleaves the bits of a buffer, alignment circuit, alignment buffer, dispersal circuit and dispersed instruction buffer to reduce the circuit area required for expanding the compacted instruction.

9 Claims, 9 Drawing Sheets

METHOD FOR STORING AND DECODING INSTRUCTIONS FOR A MICROPROCESSOR HAVING A PLURALITY OF FUNCTION UNITS

This is a continuation-in-part of co-pending, commonly assigned, Ser. No. 08/767,450, filed Dec. 16, 1996 incorporated herein by reference.

BACKGROUND OF THE INVENTION

This invention relates to computers which utilize wide instruction words to achieve instruction level parallelism and, more particularly, to methods and apparatus for storing wide instruction words in compressed form and for expanding the compressed instruction words for execution.

One of the approaches to improving microprocessor performance is instruction level parallel processing. Instruction level parallel processing involves execution in parallel of low level machine operations, such as memory loads and stores, integer additions and floating point multiplications. Processors for implementing instruction level parallelism typically include multiple execution units and are controlled by Very Long Instruction Words (VLIW's). Each VLIW specifies the operations that are to be executed in a single cycle and includes multiple operation fields, alternatively referred to as syllables. The source program is typically written in a high level language without attention to operations that can be performed in parallel. The conversion of a source program to machine code which utilizes instruction level parallelism involves scheduling of operations which can be executed in parallel. The scheduling function may be performed by a compiler or by the processor itself. When scheduling is performed by the processor, the processor hardware may become complex. When scheduling is performed by the compiler, the processor simply executes the operations contained in the VLIW. Instruction level parallel processing is described by J. A. Fisher et al in Science, Vol.253, Sep. 13, 1991, pp. 1233–1241 and by B. Ramakrishna et al in the *Journal of Supercomputing*, Vol.7, 1993, pp.9–50.

For maximum utilization of a processor having multiple execution units, each execution unit should perform an operation on every processor cycle. The execution units of the processor may be fully utilized during computation-intensive portions of a program. In this case, all or nearly all of the operation fields, or syllables, of the VLIW are filled. Other portions of the program may not require all of the resources of the processor. In this case, some of the execution units are idle, and one or more operation fields of the VLIW are filled with a no operation (NOP) code.

FIG. 1 illustrates an example of an instruction word 10 containing syllables S1–S6 which, in turn, contain operation codes for functional units F1–F6 respectively. In the example illustrated, functional units F2 and F4 are not needed to execute instruction word 10 and therefore contain NOP codes.

The number of NOPs in a program may be significant. Storing instruction words with significant numbers of NOPs in memory is wasteful of memory space. To avoid inefficient use of memory, techniques for storing wide instruction words in compressed format have been proposed.

In one conventional approach, compressed instructions are stored with a mask word. The operation syllables of the compressed instruction are stored in consecutive memory locations, or words. The mask word encodes where the operation syllables are inserted in the expanded instruction. The remaining syllables of the expanded instruction are filled with NOP codes. Since the mask word is normally only a few bits wide, two or more mask words can be grouped in the same memory word. This approach is illustrated in FIG. 2. An instruction word pair is stored in compressed format in memory as a mask word 20 followed in consecutive memory locations by operations W00, W02, W0S, W06, and W07 of a first instruction word and operations W12 and W14 of a second instruction word. A mask field 22 in mask word 20 indicates the locations of the operations W00, W02, W0S, W06 and W07 in a first line 34 of instruction cache 24, and mask field 26 indicates the positions of operations W12 and W14 in a second line 36 of instruction cache 24.

Due to the variable length of the compressed instruction format in memory, it is necessary to record the offset to the next instruction address somewhere in the instruction itself. The offset must also be stored in the instruction cache to be able to execute correct program counter sequencing and to maintain coherency between the program counter and the main memory code image. The offset to the next instruction address can be stored in mask word 20 as fields 30 and 32 and can be stored in instruction cache 24 as fields 38 and 40. An instruction compression and expansion technique similar to that shown in FIG. 2 and described above is disclosed in U.S. Pat. No. 5,057,837 issued Oct. 15, 1991 to Colwell et al. and U.S. Pat. No. 5,179,680 issued Jan. 12, 1993 to Colwell et al. The major disadvantage of using the technique shown in FIG. 2 and described above is that consecutive instructions do not correspond to consecutive instruction cache locations, as they are separated by an address difference that depends on the variable length of the instruction. This introduces an artificial alias for instructions that are physically separated by a distance that is smaller than the instruction cache size. For example, in a 1024 line instruction cache, a code section of 1024 instructions will very likely contain aliases to the same cache locations, unless proper padding is performed by the loader. This padding is possible only if empty spaces are left in main memory. In the example of FIG. 2, instruction pair #n occupies a cache hole left by the previous instructions. To achieve this, the assembler is forced to leave empty memory areas to get to the desired address of the cache hole. In the example of FIG. 2, twelve memory words are wasted to avoid a conflicting address for instruction pair #m.

In summary, the technique shown in FIG. 2 and described above has several disadvantages. The instruction cache must have a larger capacity to store the offset to the next instruction address. Program counter sequencing is complicated because it needs to compute the next instruction addresses. Also, the variable instruction length introduces artificial aliases in the instruction cache. And, if the loader pads instructions in main memory to avoid the problem of artificial aliases, holes are created in main memory.

In addition, the scheme of FIG. 2 requires the allocation of a fixed number of bits for the bit mask, which can lead to high overhead when there are only a few syllables in the instruction which are not NOPs. This scheme also requires hardware for dispersal of the instruction that occupies a large circuit area and is not easily amenable to bit interleaving.

Accordingly, a need remains for the storage of VLIWs in a compacted format wherein at least a portion of the instruction syllables containing NOPs are eliminated and wherein the compacted instructions are stored sequentially in instruction memory.

SUMMARY OF THE INVENTION

The present invention includes an instruction encoding method to reduce or eliminate NOPs in VLIW instructions.

This method for storing and decoding instructions for a microprocessor involves identifying each word of an instruction that does not contain a NOP code, generating a dispersal code for each identified word, where the dispersal code corresponds to a field of the instruction occupied by the identified word, generating a delimiter code for each identified word, where the delimiter code is set to identify a boundary between the words of the each instruction and the words of an adjacent instruction, and storing each identified word along with the corresponding dispersal and delimiter codes. This method results in smaller programs which reduces the amount of disk and main memory usage in a computer. The method may also be applied to an on-chip cache memory which stores instructions in the same format resulting in better utilization of on-chip cache memory.

The present invention can be implemented in a processor comprising a plurality of functional units and having a buffer for storing compacted instructions, each compacted instruction including words containing an operation code, a dispersal code, and a delimiter code. Alignment means parses each one of the compacted instructions from the buffer based upon the delimiter codes of the words of each compacted instruction. An alignment buffer stores each compacted instruction after the compacted instruction is parsed from the buffer means. A dispersed instruction buffer stores an executable instruction, wherein the executable instruction includes an operational field corresponding to each one of the plurality of functional units. Dispersal means transfers each word of the compacted instruction stored in the alignment buffer into at least one operational field of the executable instruction responsive to the dispersal code corresponding to the word.

A further aspect of the present invention is a bit interleaving technique for the storage of instructions in on-chip cache memory wherein the bits of an instruction word are interleaved when the instruction is fetched from memory. Thereafter, the identified words of the instruction are parsed from those of adjacent instructions and dispersed in interleaved format. The instruction words are then de-interleaved before being distributed to their corresponding functional units. This makes the instruction encoding method more efficient for large instruction widths without an area and speed penalty in the dispersal of instructions to functional units. This latter aspect of the invention is not limited to VLIW machines, but also applies to any processor with multiple functional units.

The foregoing and other objects, features and advantages of the invention will become more readily apparent from the following detailed description of a preferred embodiment of the invention which proceeds with reference to the accompanying drawings.

DETAILED DESCRIPTION

Figure 1:
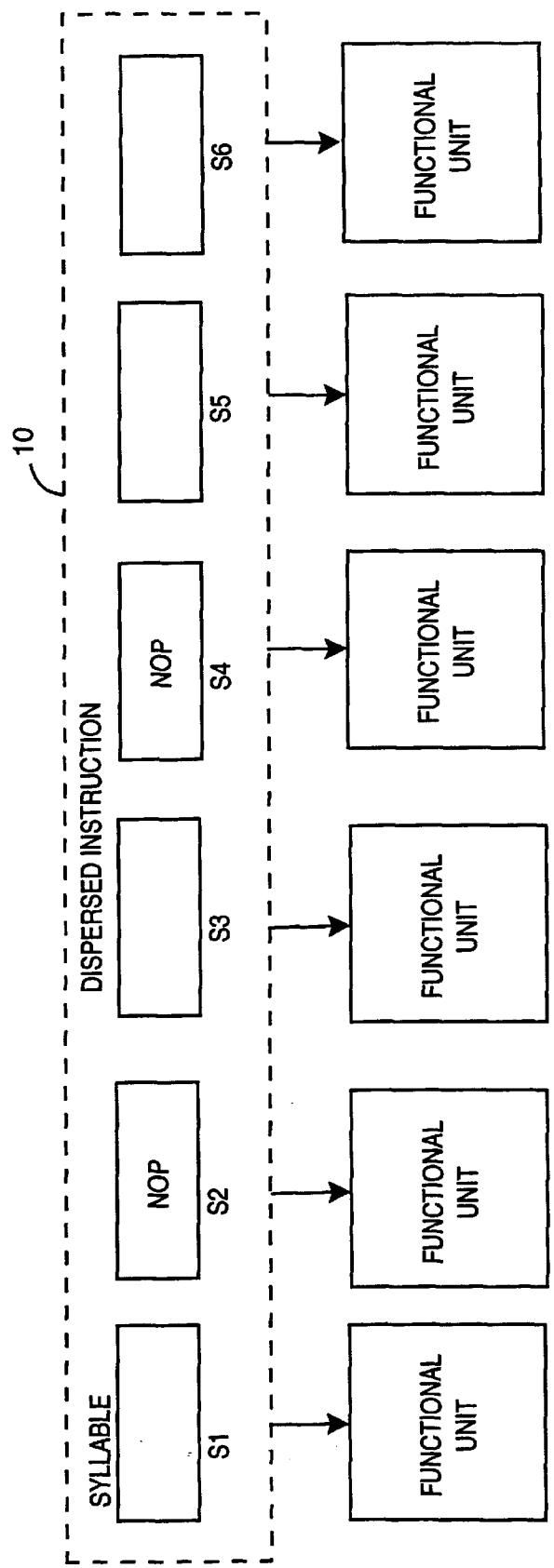
FIG. 1 is a schematic diagram of a conventional VLIW with syllables that correspond to functional units of a VLIW processor.
Figure 2:
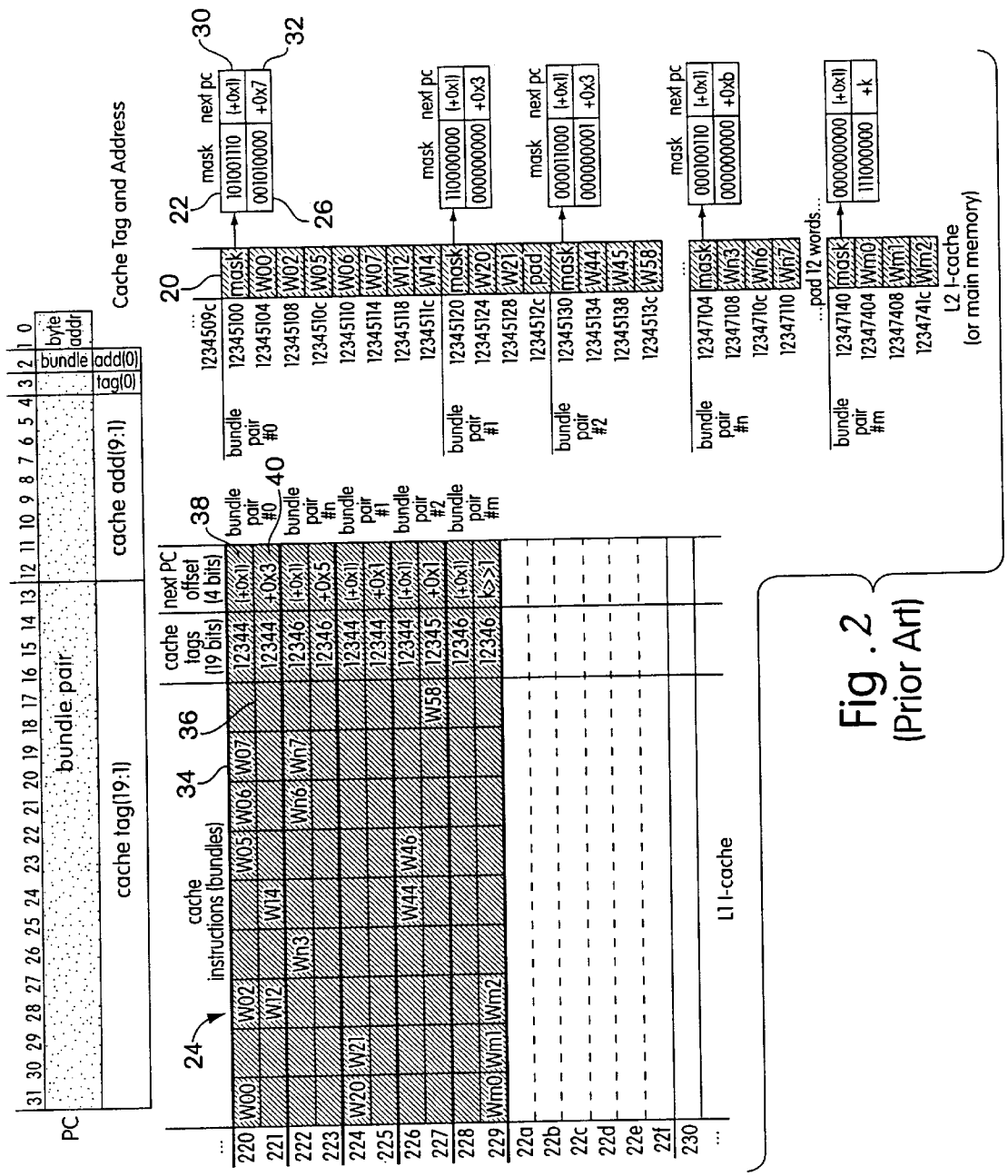
FIG. 2 is a schematic representation of an instruction cache and a memory in a conventional processor, illustrating storage of wide instruction words in compressed format.
Figure 3:
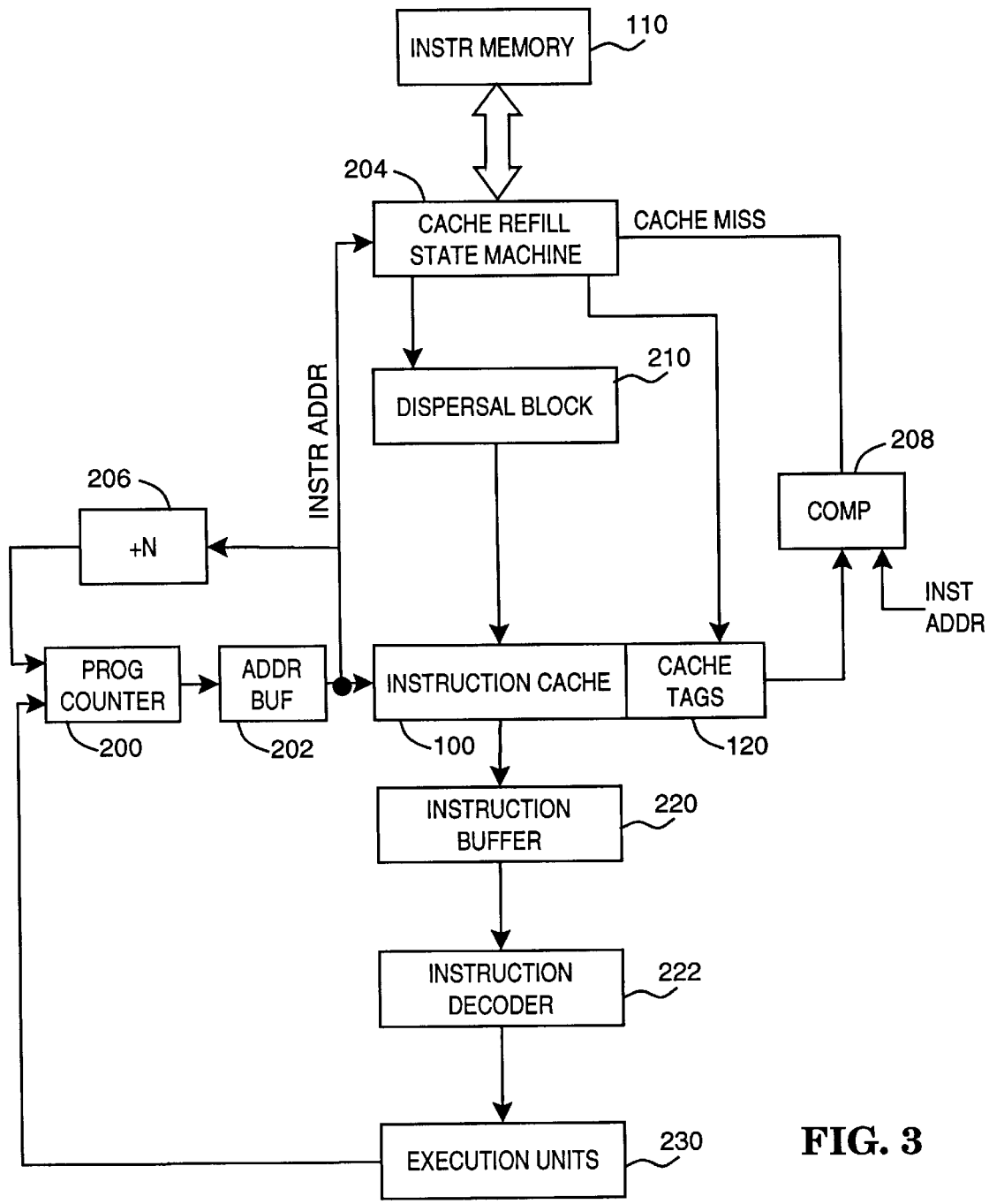
FIG. 3 is a block diagram of a VLIW computer system according to the present invention which reads and expands compacted VLIWs for execution.

A block diagram of a computer system according to the present invention, illustrating portions required for storing and expanding wide instruction words and for executing wide instruction words, is shown in FIG. 3. A program counter 200 provides successive instruction addresses of a program being executed to instruction cache 100 through an address buffer 202. Instruction addresses are also provided to a cache refill state machine 204, an adder 206 which increments program counter 200, and to a comparator 208. The cache refill state machine 204 controls refilling of instruction cache 100 from instruction memory 110 when a cache miss occurs. A cache miss occurs when the required instruction word, i.e. the instruction word specified by the instruction address, is not present in instruction cache 100. Dispersal block 210 controls expansion of compressed instruction words stored in instruction memory 110 to expanded instruction words for storage in instruction cache 100.

When the expansion of the instruction word is complete, it is transferred into instruction cache 100. Instruction words are transferred from instruction cache 100 to an instruction buffer 220 and then to an instruction decoder 222. The instruction decoder 222 decodes each operation in the instruction word and provides control signals to execution units 230. In a processor which utilizes wide instruction words, execution units 230 may include two or more arithmetic units and/or multipliers for parallel computation. Furthermore, the execution units 230 may access a data cache and/or memory in parallel with the computations. In the case of a branch instruction, the execution units 230 may supply the program counter 200 with a branch address, thereby overriding normal program sequencing. The comparator 208 compares the instruction address with the cache tags 120 to determine if the required instruction word is present in instruction cache 100.

Figure 4:
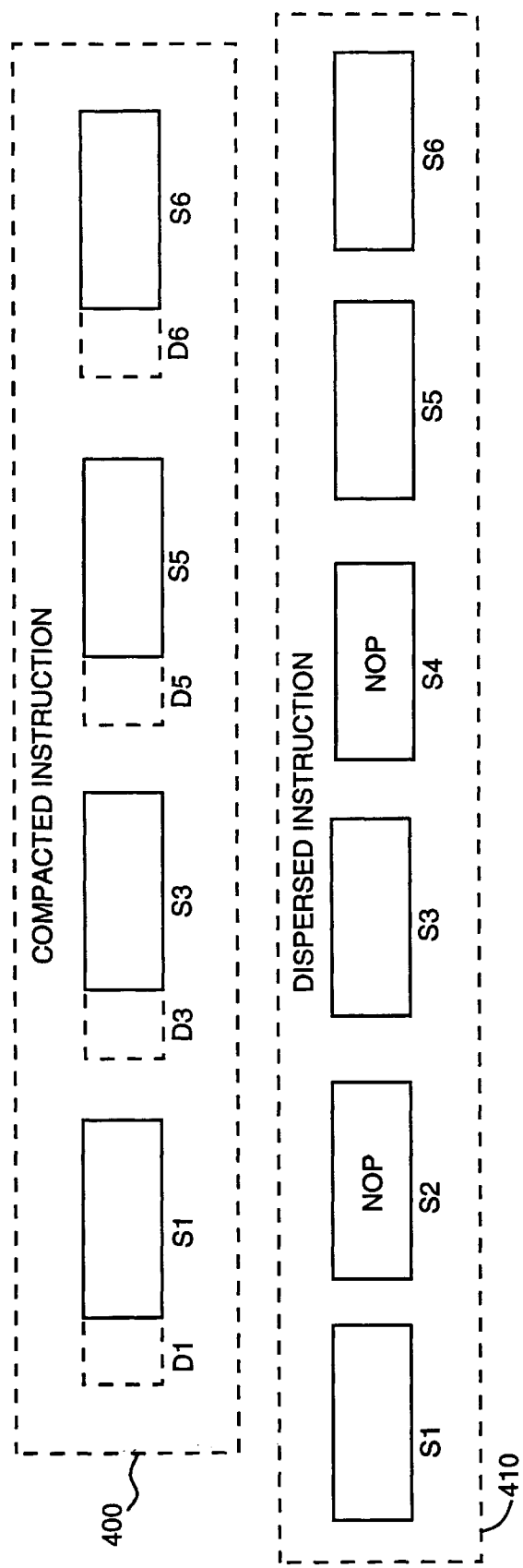
FIG. 4 is a schematic diagram illustrating the format of a compacted instruction according to the present invention in the instruction memory of the computer system of FIG. 3 and its relationship to a dispersed instruction in the instruction buffer of FIG. 3.

FIG. 4 illustrates an example of an embodiment of the compacted instruction format of the present invention wherein each syllable of compacted instruction word 400 also contains a set of dispersal bits. Compacted instructions have at least a portion of the syllables in the VLIW corresponding to NOPs eliminated. Syllables S1, S3, S5 and S6 of compacted instruction 400 contain operation codes that are not NOPs and, in addition, dispersal bit sets D1, D3, D5 and D6 respectively. Each syllable's dispersal bits encode the functional unit where the syllable is to be executed. After a compacted instruction is fetched, dispersal hardware uses the dispersal bits for each syllable to route the syllable to its corresponding functional unit. This frees syllables from being restricted to a fixed location in a compacted instruction.

In general, the truth table performing a mapping of D to F might be different for different syllables S in the compacted instruction. For example, D1=000 might encode S1 should be dispersed to F1, while the same value for D3 might encode that S3 is to be dispersed to F2. The syllables in a compacted instruction generally, but not necessarily, do not have any NOPs.

Figure 5:
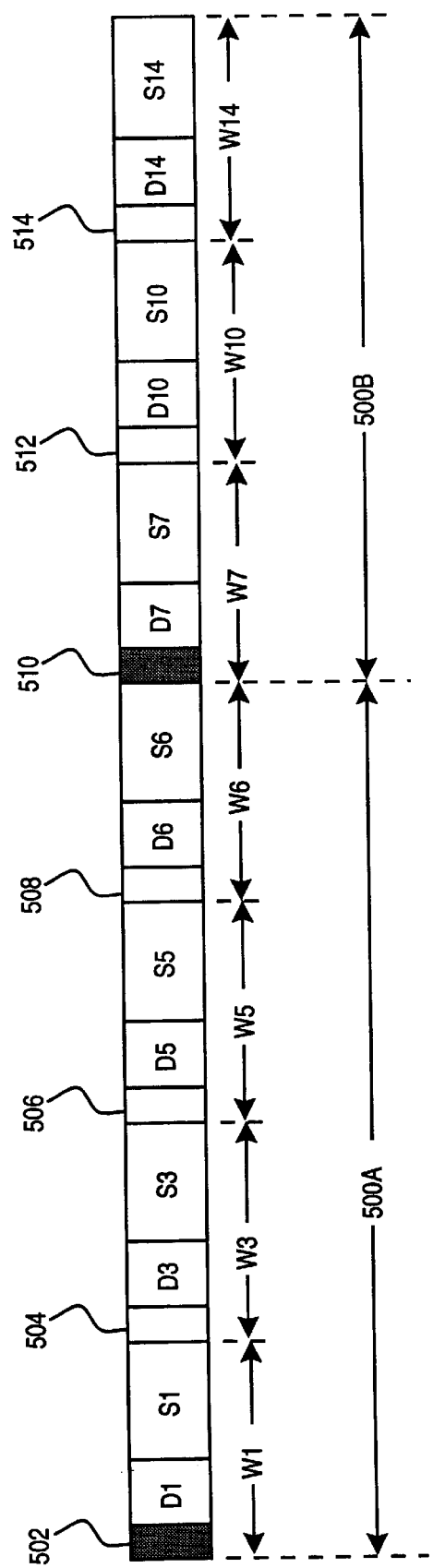
FIG. 5 is a schematic diagram illustrating the format of sequential compacted instructions according to the present invention in the instruction memory of FIG. 3.

An example of the delimiter encoding scheme of the present invention is shown in FIG. 5. In addition to a dispersal bit set, each syllable of the compacted instruction also includes delimiter encoding to indicate the boundaries between sequential compacted instructions. This encoding is in the form of a single bit included in each syllable called a start bit.

In the start bit scheme, the bit is set to one value for the first syllable in a compacted instruction and to the opposite value for all other syllables of the compacted instruction. Alternatively, a stop bit scheme may be employed wherein the stop bit is set to one value for the last syllable in a compacted instruction and to the opposite value in all other syllables of the compacted instruction.

For example, syllable S1 of compacted instruction 1 in FIG. 5 includes dispersal bits D1 and S-bit 502 which is set to indicate the start of compacted instruction 1. In contrast, S-bits 504, 506 and 508 corresponding to syllables S3, S5 and S6 respectively are clear to indicate that they are part of the same compacted instruction indicated by S-bit 502. S-bit 510 corresponding to syllable S7 of compacted instruction 2 is also set indicating the end of compacted instruction 1 and the beginning of compacted instruction 2.

The delimiter encoding scheme described above is utilized by an instruction sequencing method and apparatus to control the fetch of each successive instruction from memory storage. An example of such an instruction sequencing method and apparatus is disclosed in the commonly-assigned patent application titled METHOD AND APPARATUS FOR STORING AND EXPANDING PROGRAMS FOR WIDE INSTRUCTION WORD PROCESSOR ARCHITECTURES, Ser. No. 08/767,450, the disclosure of which is herein incorporated by reference.

Figure 6:
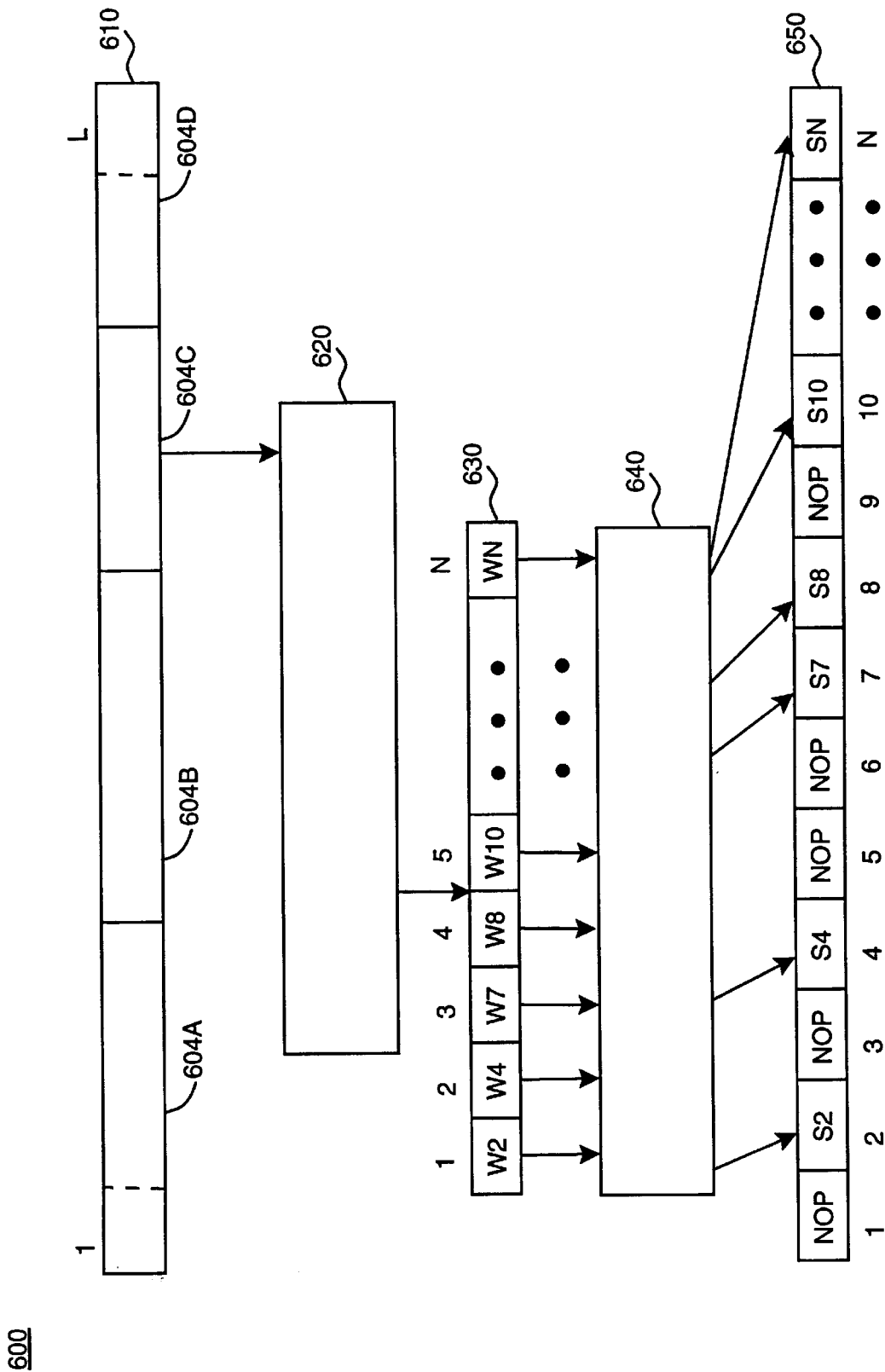
FIG. 6 is a block diagram of an embodiment of the dispersal block of FIG. 3 according to the present invention and a line of instruction cache, alignment logic, alignment buffer, expansion logic and dispersed instruction buffer of FIG. 7.
Figure 7:
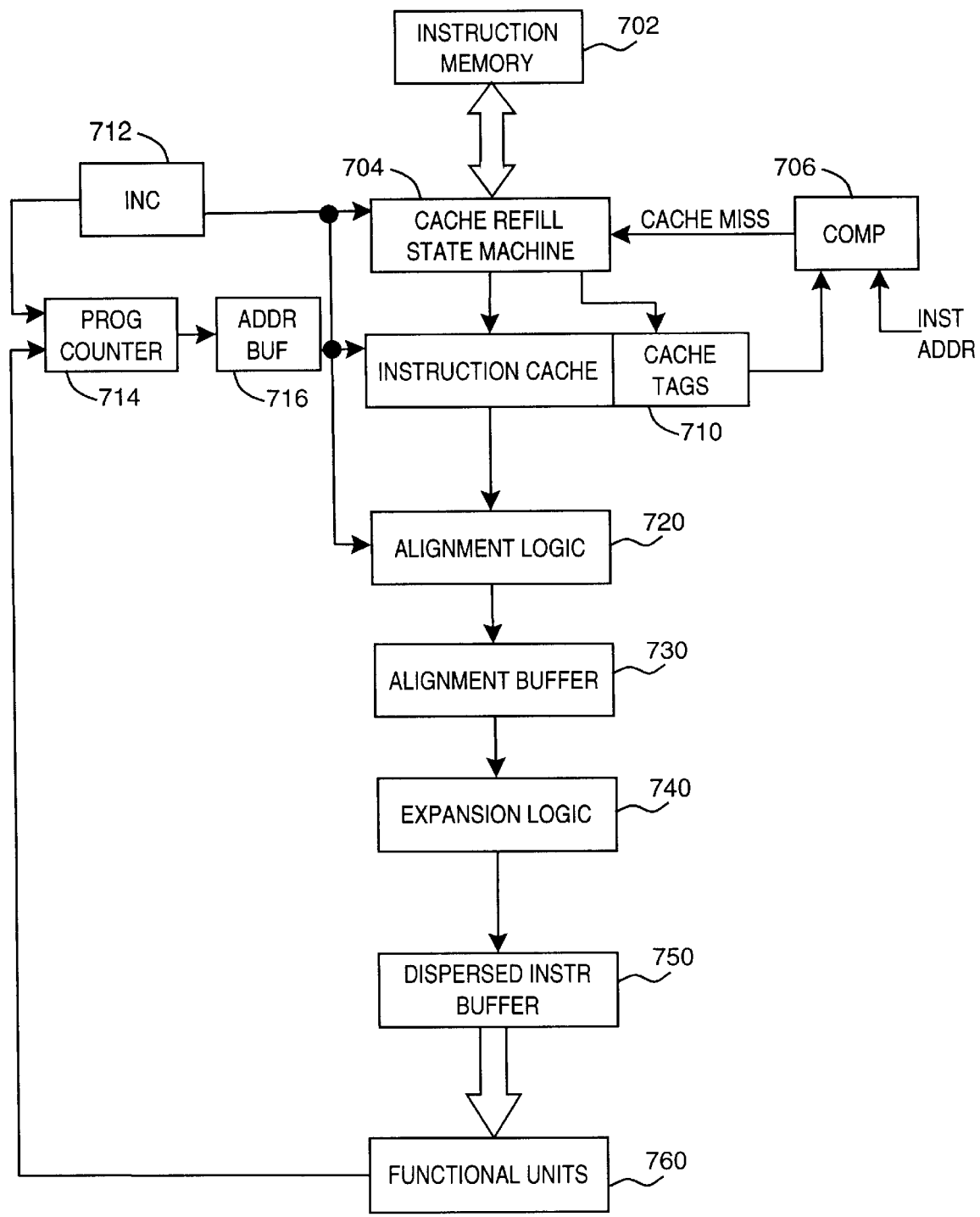
FIG. 7 is a block diagram of a VLIW computer system incorporating the line of instruction cache, alignment logic, alignment buffer, expansion logic and dispersed instruction buffer illustrated in FIG. 6.

FIG. 6 is a diagram showing the extraction and dispersal of compacted instructions in a processor with instructions encoded as described above with regard to dispersal block 210 of FIG. 3 and which also describes the function of a line of instruction cache 710, alignment logic 720, alignment buffer 730, expansion logic 740 and dispersed instruction buffer 750 of FIG. 7. The function of dispersal block 600 is to transform a compacted instruction into a fixed length dispersed instruction which is output on interconnect wires which are routed to functional units FU1–FUN. From a functional standpoint, a sequence of compacted instructions, such as 604A, 604B, 604C and 604D, are read in from memory and arranged in line buffer 610 that is filled from instruction memory, which also represents a line of instruction cache 710 for the embodiment of FIG. 7.

It should be noted that compacted instructions are stored in memory on the basis of the line length of the instruction cache or line buffer. The assembler that assembles the operation code for the processor will fit as many complete sequential compacted instructions as will fit in the line length and will pad any word spaces in the line that do not contain an instruction word. Instructions are fetched from memory by the processor on a line basis each time a memory access is made. Therefore, only complete instructions are contained in each line. Compacted instructions can be permitted to straddle line boundaries by splitting the instruction cache into multiple banks and adding logic to fetch multiple consecutive instruction lines. However, the number of interconnect wires required is also multiplied and additional prefetch logic is required.

First, a compacted instruction, 604C in the example illustrated, is parsed and extracted from buffer 610 based upon the delimiter bits of the individual words of the compacted instructions in line buffer 610. Extraction of a compacted instruction can take place from any instruction word position in buffer 610 using the delimiter bit scheme described above. In the illustrated example, beginning with the start bit of instruction word W2, the instruction 604C is parsed from buffer 610 by alignment logic 620, aligned and stored in alignment buffer 630.

The instruction words in alignment buffer 630 are then expanded to dispersed instruction buffer 650 based upon the D bits associated with each word. For example, the D bits of W2 indicate that W2 is to be dispersed to the dispersed instruction buffer field 2 which corresponds to FU2. The fields of dispersed instruction buffer 650 have a one to one correspondence with the functional units. The D bits for each instruction word in alignment buffer 630 can indicate that the associated instruction word is to be distributed to one or more fields of dispersed instruction buffer 650. The fields of dispersed instruction buffer 650 that do not receive instruction words from alignment buffer 630 are loaded with NOPs.

If line buffer 610 holds L instruction words, the alignment function of alignment logic 620 for loading alignment buffer 630 requires an L position shifter circuit. Each instruction word has a predetermined number of bits B. Each of the B bits of a word are shifted as a group, without differentiation, by the same amount. Alignment buffer 630 holds from 1 to N syllables, where N is the number of functional units. The word positions in alignment buffer 630 are numbered from 1 to N. The alignment buffer 630 can be constructed to hold more than N words, but these extra words are ignored because no more than N words can be dispersed in a cycle. The B bits of W2 in field 1 of alignment buffer 630 can come from any of the L word fields in line buffer 610. This requires a traversal in alignment logic 620 of a B bit bus from the furthest word position in line buffer 610 to field 1 in alignment buffer 630. The height of alignment logic 620 is therefore proportional to the product L*B.

Expansion logic 640 has connections that allow an instruction syllable in field 1 of alignment buffer 630 to be routed to any of the fields 1 through N of dispersed instruction buffer 650 for routing to any of the functional units FU1 through FUN. An instruction syllable in field 2 of alignment buffer 630 is routable to fields 2 through N of dispersed instruction buffer 650. The remaining fields of alignment buffer 630 are similarly dispersable via expansion logic 640 to the fields of dispersed instruction buffer 650. The longest signal run in expansion logic 640 has a length proportional to N*B. The height of expansion logic 640 is also proportional to N*B.

For large values of L, N and B, alignment logic 620 and expansion logic 640 require interconnect wires that travel long distances and occupy a large area of the chip. This is detrimental to the performance and cost of the resulting circuit.

The number of D bits in each instruction word is dependent on the number of functional units in the processor and the desired dispersal range of each instruction syllable (i.e. the range of functional units to which an instruction syllable may be distributed based upon the D bits of the instruction word). One approach is to require that each syllable be dispersable to any of N functional units. In this case, the number of bits in D is $\log_2(N)$, rounded up to the next integer. Therefore, if there are eight functional units (N=8), then three D bits are required per instruction word to disperse the instruction syllable to all eight functional units.

Another approach is to restrict each syllable to being dispersed to a subset of functional units in order to reduce the complexity and size of expansion logic 640 and reduce the size of each instruction word. For example, each syllable may be limited to dispersal to four "nearby" functional units. In this case, the length of D would be 2. This second approach will not allow all NOPs to be eliminated from the compacted instructions.

FIG. 7 illustrates another computer system adapted to utilize the compacted instructions described above. The computer system 700 of FIG. 7 is similar to the computer system of FIG. 3 except that computer system 700 stores the VLIW instructions in an instruction cache 714 in the same compacted form as the instructions in instruction memory 700. This makes better use of instruction cache 714 by reducing or eliminating the NOPs stored in the cache. Storing instructions in compacted form in instruction cache 714 has the additional advantage of keeping the instruction cache addresses the same as the instruction memory addresses. However, the expansion and dispersal functions described in connection with dispersal logic 600 of FIG. 6 are required to operate in the processor pipeline after the fetch stage for a compacted instruction.

As described in the context of dispersal logic 600 of FIG. 6 above, words from instruction cache 710 are transferred to alignment buffer 730 through alignment logic 720 which parses the compacted instruction from the instruction cache line and aligns the compacted instruction with its start bit. Expansion logic 740, based upon the D bits for each instruction word, then disperses operation codes of the instruction words in alignment buffer 730 to the fields of dispersed instruction buffer 750. Dispersed instruction buffer 750 has a field corresponding to each of the functional units in block 760 and those fields which do not receive an operation code syllable from an instruction word in alignment buffer 730 are filled with a NOP code.

Figure 8:
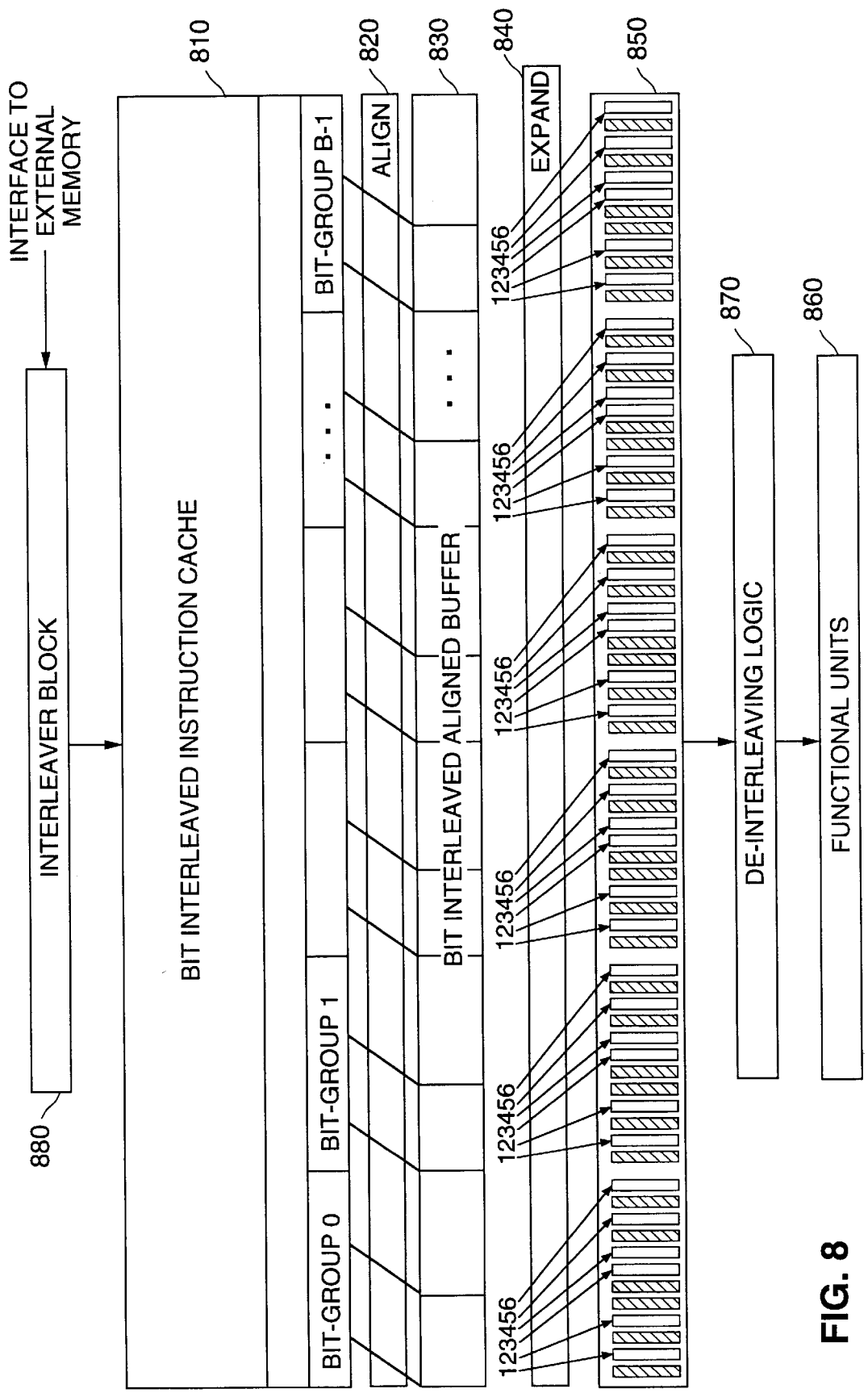
FIG. 8 is a block diagram illustrating an embodiment of a dispersal circuit according to the present invention in which the bits of the compacted instructions are interleaved.

To reduce the length of interconnect wires and reduce the chip area required by the dispersement logic 600 shown in FIG. 6, the present invention can be implemented with a bit interleaved dispersement logic 800 as shown in FIG. 8.

When an instruction line is fetched from external memory, the instruction words in the fetched line are bit interleaved by interleaver logic 880 before being stored in bit interleaved instruction cache 810. The instructions in external memory are kept in their conventional form with bits within each instruction word being adjacent to one another. The instruction words are interleaved when they are brought on to the chip from external memory, either for storage in instruction cache 810 or into a line buffer. The bits of each of the instruction words in the fetched line are interleaved in instruction cache 810.

In most situations the number of bits B per instruction word is a power of 2, i.e. 16, 32, 64. The number of syllables L in a line buffer or line of instruction cache 810 is also typically a power of 2. However, this is not strictly necessary, and the bit interleaving scheme simply relies on each instruction word being the same size. The line buffer has B groups of L bits per group, each group is called a 'bitgroup'.

In instruction cache 810, the bit 0 of all the instruction words are in bit group 0, the bit 1 of all the instruction words are in bit group 1 and so on for each bit up to bit (B-1), where B is the size of the instruction words. Each bit group is therefore L bits in size, where L is the line length of the instruction cache 810. Bit 0 of all the instruction words of the fetched line are physically adjacent to each other in instruction cache 810, alignment logic 820, alignment buffer 830, expansion logic 840 and dispersed instruction buffer 850 which are all bit interleaved. The same scheme applies to each of the other bit groups as well.

Since the first bit of each instruction word is the start bit, bit group 0 becomes a collection of the start bits of all the instruction words in the buffer and can be used to drive the alignment logic 820 in parsing and aligning each instruction in the fetched line. For example, a bit interleaved compacted instruction can be aligned by simply left shifting all the bit groups until a bit set to 1 is found in bit group 0.

The D bits for each instruction word are then used to disperse the bit from that instruction word in each bit group in aligned buffer 830 to the appropriate bit group field in dispersed instruction buffer 850. Each functional unit in block 860 has a corresponding bit in each bit group field of dispersed instruction buffer 850. The bits in each bit group field in dispersed instruction buffer 850 which are not populated with a bit from the aligned buffer 830 are populated with a bit value that results in a NOP code being sent to the corresponding functional unit in block 860.

The expanded instruction in dispersed instruction buffer 850 is then de-interleaved such that intact, non-bit-interleaved, operation codes then arrive at functions unit 860. All the bits in an instruction word that need to be sent to a given functional unit need to be gathered adjacent to each other at the functional unit. This de-interleaving is relatively simple because it does not involve any control mechanism. This means that a signal run in a certain location is routed to another location without any third signal controlling either the starting or ending locations. There are no multiplexers or active circuitry involved in the de-interleaving function, it is simply a routing of interconnect wires which can even be achieved by a simple "bend" in the complete set of interconnect wires. Therefore the area overhead of de-interleaving network 870 is small. There is a net benefit of total area reduction.

The result of bit-interleaving is that the alignment function of alignment logic 820 is performed on each bit-group in parallel. The alignment amount is the same for each bit group. There is no need for the instruction bits at one end of the line buffer to travel the full line length of the line buffer or instruction cache 810. The bits simply travel within their bit-groups. The maximum distance traversed by any instruction bit is therefore proportional to L rather than L*B, a savings of a factor of B. This yields a savings of a factor of B in the height of interconnection area for alignment logic 820.

There are similar savings in expansion logic 840. Within each bit-group, the bits are dispersed to single-bit slices of the N functional units. The bits within each bit-group then do not need to be sent over long distances. The distance is proportional to N rather than N*B, a savings of a factor of B. The dispersal of all bit-groups occurs in parallel. This yields a savings of a factor of B in the height of interconnection area for expansion logic 840.

Figure 9:
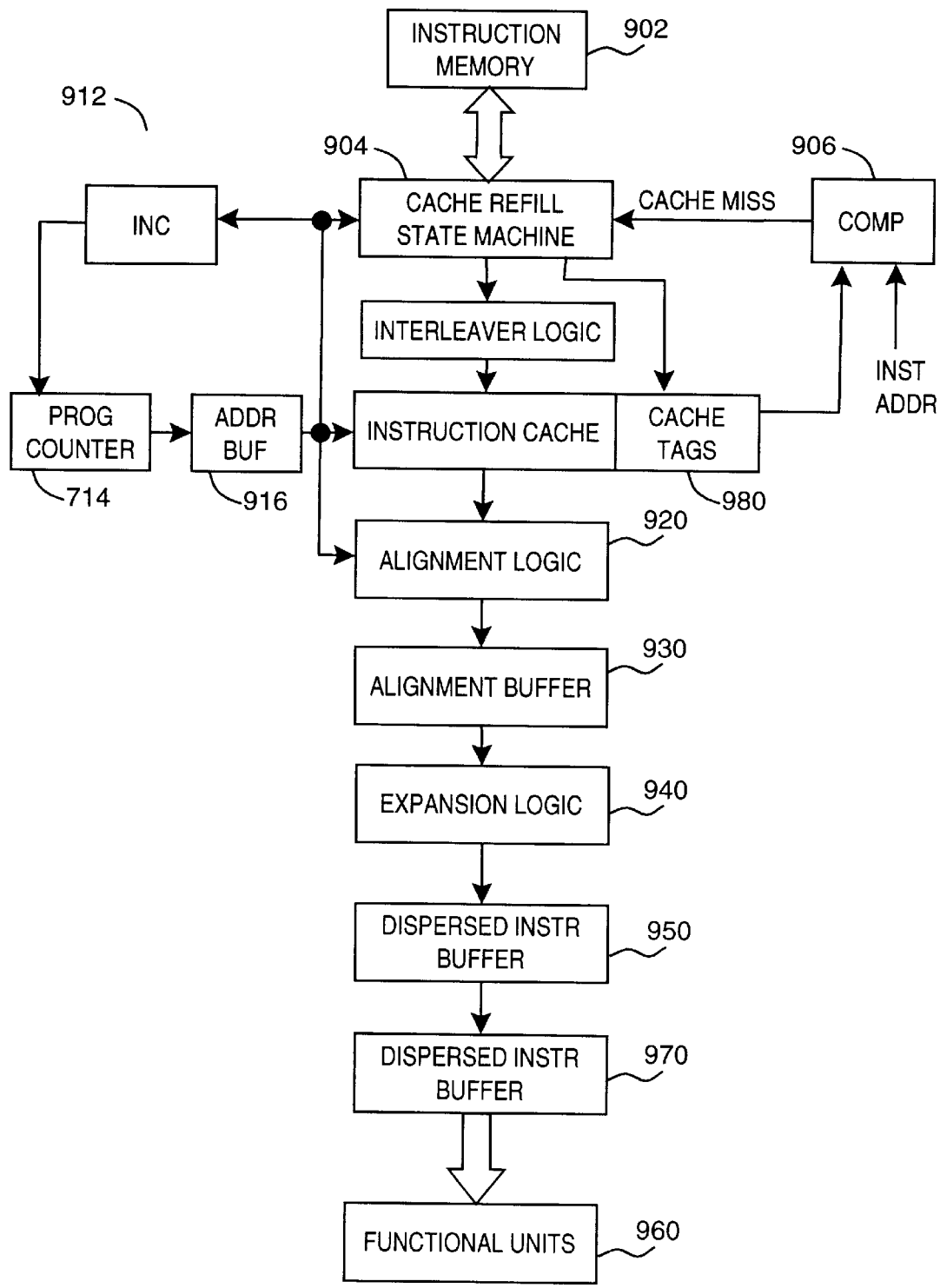
FIG. 9 is a schematic block diagram of a VLIW computer system incorporating the bit interleaved dispersal circuit of FIG. 8.

A computer system using the bit interleaved logic of FIG. 8 is illustrated in FIG. 9. Lines read in from instruction memory 902 by cache refill state machine 904 are bit interleaved by interleaver logic 980 and stored in interleaved format in instruction cache 910. A compacted instruction in bit interleaved format is read out of instruction cache 910, aligned in bit interleaved format and aligned by alignment logic 920 for storage in alignment buffer 930. Expansion logic 940 then disperses the bits from the instruction words of the compacted instruction in alignment buffer 930 and stores the bits of the expanded instruction in dispersed instruction buffer 950. The expanded instruction is then reassembled in non-interleaved format by de-interleaver network 970 so that full instruction codes are received by functional units 960.

Having described and illustrated the principles of the invention in a preferred embodiment thereof, it should be apparent that the invention can be modified in arrangement and detail without departing from such principles. I claim all modifications and variations coming within the spirit and scope of the following claims.

We claim:

1. A method for storing and decoding instructions for a microprocessor comprising the steps:

identifying each word of one the instructions that does not contain a NOP code;

generating a dispersal code for each identified word, the dispersal code corresponding to a field of the instruction occupied by the identified word;

generating a delimiter code for each identified word, the delimiter code being set to identify a boundary between the identified words of the instruction and the identified words of an adjacent instruction and the delimiter code being otherwise clear;

storing each identified word along with the corresponding dispersal code and the delimiter code in a compressed instruction, said compressed instruction lacking dispersal codes for each word of said instruction that contains a NOP.

2. The method of claim 1 including:

fetching the compressed instruction;

parsing the identified words of the compressed instruction from those of the adjacent instruction based on the delimiter code;

restoring each identified word to the field of the instruction indicated by the corresponding dispersal code; and placing NOP codes in each field of the instruction that does not contain an identified word; and distributing each instruction word to a corresponding functional unit.

3. The method of claim 2, wherein each dispersal code identifies a corresponding field on the instruction.

4. The method of claim 2, wherein each dispersal code identifies one of the functional units, said one of said functional units being identified by its position in a sequence of functional units.

5. The method of claim 4, wherein the position of the functional units corresponding to the dispersal code is relative to a position of the instruction word in the instruction after parsing.

6. The method of claim 2 wherein:

the step of fetching the instruction includes interleaving the bits of the instruction words of the instruction;

the step of parsing the identified words of the instruction from those of the adjacent instruction based on the delimiter codes includes the step of parsing the bits of the identified words in interleaved format;

the step of dispersing each identified word to the field of the instruction word indicated by the corresponding dispersal code includes dispersing the bits of each identified word in interleaved format;

the step of placing NOP codes in each field of the instruction word that does not contain an identified word includes placing NOP codes in the bits of each field of the instruction word that does not contain an identified word in interleaved format; and the step of distributing the instructions words to said corresponding functional unit includes de-interleaving the bits of the instruction word before distributing the instruction words to said corresponding functional unit.

7. The method of claim 6, wherein the dispersal code identifies one of a plurality of fields of the instruction.

8. The method of claim 6, wherein each dispersal code identifies one of the functional units, said one of said functional units being identified by its position in a sequence of functional units.

9. The method of claim 8, wherein the position of the functional units corresponding to the dispersal code is relative to a position of the instruction word in the instruction after parsing.

* * * * *